C. S. CRANE.
Improvement in Hoisting Apparatus.
No. 128,465.  Patented July 2, 1872.
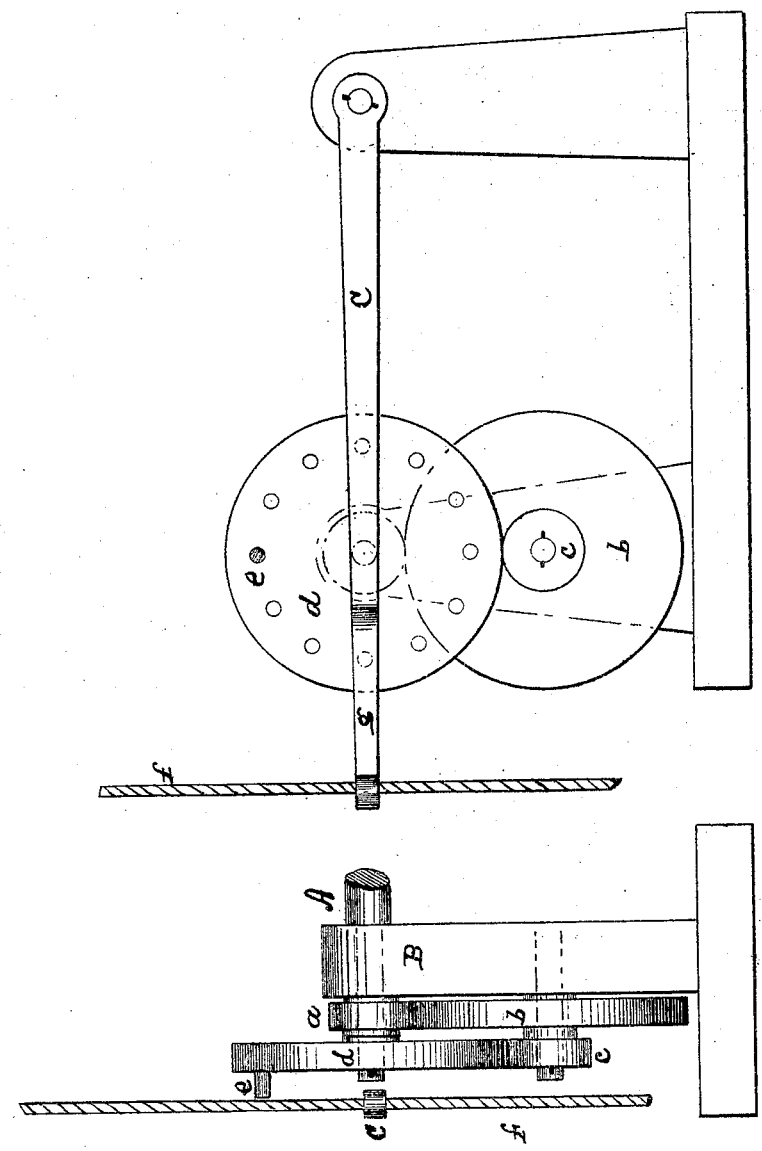
Witnesses.  Charles S. Crane
  Inventor

UNITED STATES PATENT OFFICE.

CHARLES S. CRANE, OF CHICAGO, ILLINOIS.

IMPROVEMENT IN HOISTING APPARATUS.

Specification forming part of Letters Patent No. 128,465, dated July 2, 1872.

SPECIFICATION.

I, CHARLES S. CRANE, of the city of Chicago, in the county of Cook and State of Illinois, have invented a certain new and useful Improvement in Hoisting Apparatus, of which the following is a full description, reference being had to the accompanying drawing making a part of this specification, in which—

Figure 1 is a side elevation, and Fig. 2 an end view.

The object of my invention is to provide a new device for stopping the downward or upward movement of the cage or platform when the same has reached either its lowest or highest point. This I accomplish by means of a system of wheels and a pin for operating the reversing lever.

In the drawing, A represents the shaft, upon which the driving-drum of the apparatus is placed, which drum is not shown; B, one of the standards, in which one of the bearings of the shaft A is located; C, the reversing-lever. $a$ is a small wheel, permanently secured to the shaft A; $b$, another wheel, driven by $a$; $c$, a small wheel, located upon the shaft upon which $b$ is placed and moving with $b$; $d$, another wheel, which is driven by $c$; $e$, a pin, placed wherever desired on the wheel $d$. $f$ is the reversing-cable. The pin $e$ is to be so located, and the wheels $a\ b\ c\ d$ so arranged, that the pin will come in contact with the reversing-lever C when the platform reaches either it lowest or highest point.

The wheels $a\ b\ c\ d$ should be gear-wheels.

The operation of my device is as follows: The wheels $a\ b\ c\ d$ revolve with the shaft A, which carries the drum, and the pin $e$ will come in contact with the reversing-lever either on the upper or lower side thereof when the platform has reached either its highest or lowest point, as the case may be, reversing the lever and stopping the machinery.

The outer end of the lever C is bent away from the wheel $d$ so that the pin $e$ can pass the lever, but the other part is located so near the face of this wheel that the pin cannot pass the lever but must come in contact with it.

What I claim as new is—

In combination with the reversing-lever C, the time-wheels, constructed and arranged to operate substantially as and for the purpose specified.

CHARLES S. CRANE.

E. A. WEST,
O. W. BOND.